June 13, 1950 F. E. ELLITHORPE 2,511,401
WINDSHIELD VISOR
Filed July 15, 1946 2 Sheets-Sheet 1
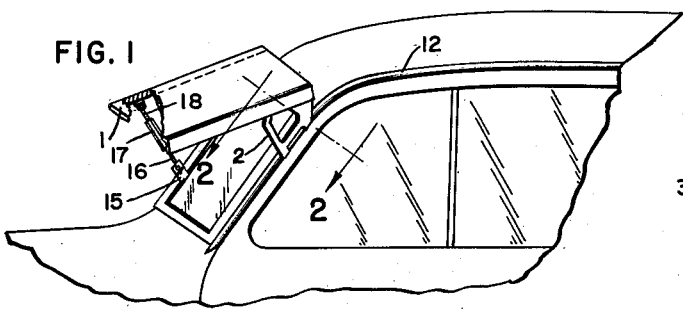
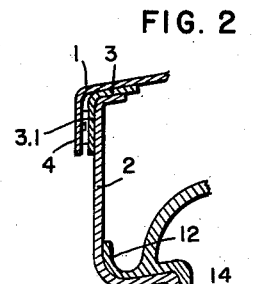
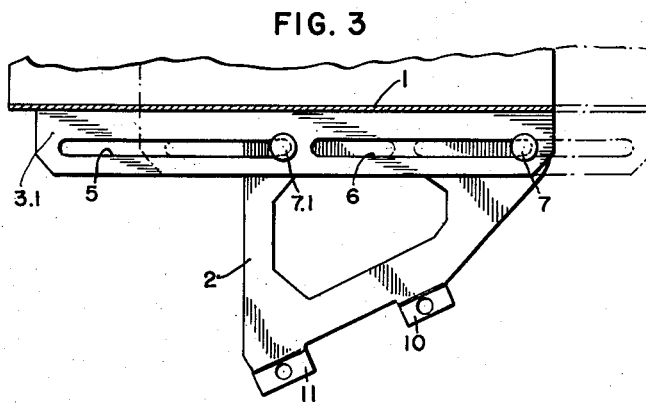
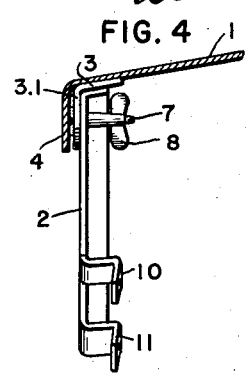
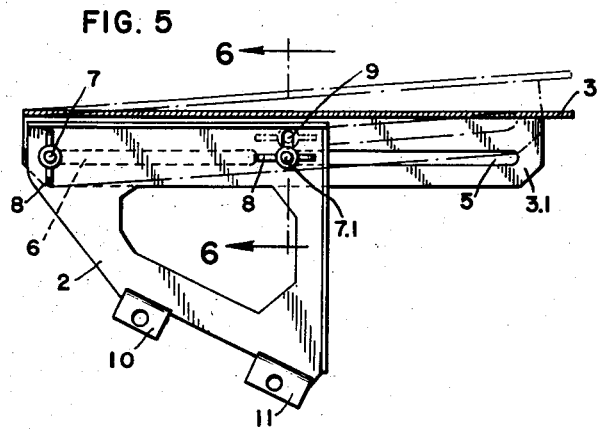
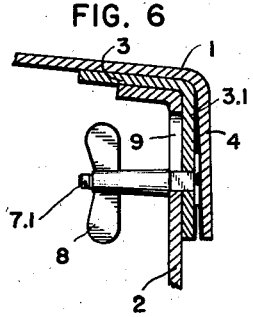
INVENTOR
FRANK E. ELLITHORPE
BY
ATTORNEYS June 13, 1950  F. E. ELLITHORPE  2,511,401
WINDSHIELD VISOR
Filed July 15, 1946  2 Sheets-Sheet 2
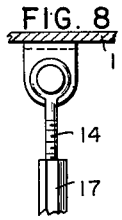
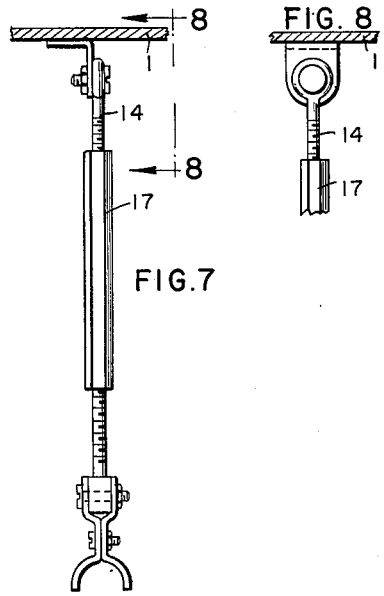
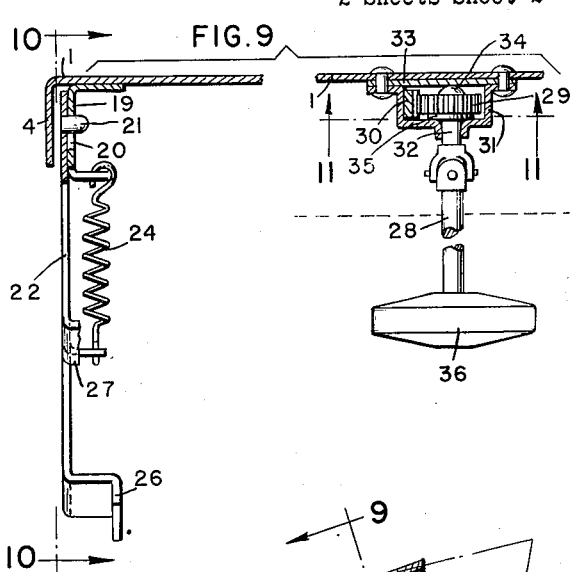
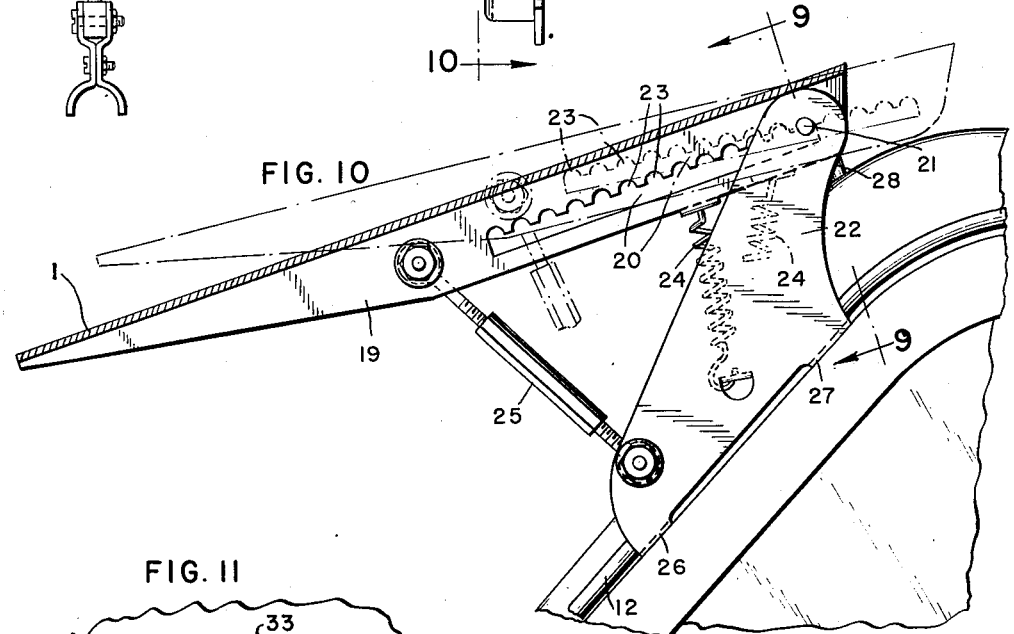
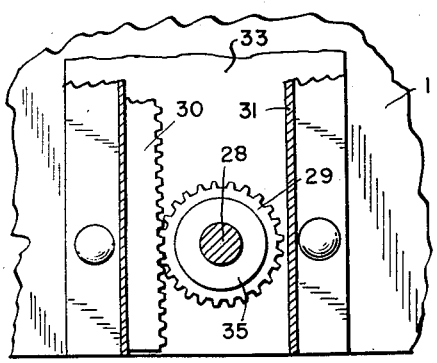
INVENTOR
FRANK E. ELLITHORPE
BY
ATTORNEYS Patented June 13, 1950

2,511,401

UNITED STATES PATENT OFFICE 2,511,401

WINDSHIELD VISOR

Frank E. Ellithorpe, Glendale, Calif.

Application July 15, 1946, Serial No. 683,595

11 Claims. (Cl. 296—95)

This invention relates to visors or awnings for the windshield of an automobile and particularly to adjustable visors, adaptable to the sloping windshield of an automobile and improved means for mounting the same.

The main objects of this invention are to provide an improved auto visor capable of both horizontal and angular adjustment relative to the automobile windshield; to provide an improved mounting means for adjustable windshield visors or awnings; to provide an improved auto visor construction capable of being adjusted readily from the interior of the automobile; to provide an improved and simplified arrangement for automobile visors whereby the same can be quickly and easily adjusted for both extent of overhang and angular position with respect to the automobile windshield; and to provide an improved mounting arrangement for auto visors whereby no part of the exterior finish of the automobile body need be marred or otherwise damaged during attachment or detachment of the improved visor.

Specific embodiments of this invention are shown in the accompanying drawings in which:

Figure 1 is a side view of the improved visor as applied over the sloping windshield of an automobile.

Fig. 2 is a sectional view, as taken on line 2—2 of Fig. 1, showing the improved manner of attaching the visor supporting brackets to the automobile body.

Fig. 3 is a view in side elevation, of the left hand visor supporting bracket showing the visor in section and the arrangement for horizontal adjustment of the same.

Fig. 4 is an end view of the same.

Fig. 5 is a view, in elevation, showing the reverse or inner side of the bracket shown in Figs. 3 and 4 and illustrating an arrangement for angular adjustment of the visor.

Fig. 6 is a fragmentary sectional view as taken on line 6—6 of Fig. 5.

Fig. 7 is a detail view of a pivotally connected and adjustable visor supporting element such as may be used as a center support for the visor shown in Fig. 1.

Fig. 8 is a fragmentary side view of the same as taken on line 8—8 of Fig. 7.

Fig. 9 is a broken sectional view showing modified form of the visor mounting and adjusting arrangement as taken on line 9—9 of Fig. 10.

Fig. 10 is a side view showing the modified visor mounting means and its relation to the sloping wind shield and top of an automobile; and Fig. 11 is a sectional view as taken on line 11—11 of Fig. 9 showing the visor adjusting means.

As shown in the drawings, the improved auto visor comprises a shield or awning 1 disposed transversely across the upper part of an automobile windshield, so as to project outwardly over the same, and suitably supported on a pair of end brackets or supporting members 2 which in turn are secured to the inside of the automobile body door-frame and project upwardly therefrom on the outside of the body adjacent the upper part of the windshield.

The visor or awning may be made from any suitable rigid or semi-rigid material, such as aluminum, wood or wood composition, stainless steel, or a suitable plastic compound and is preferably made in one piece having downwardly turned ends so as to present a smooth unbroken appearance.

As shown in Figs. 2, 4 and 6 suitable angle members 3 are provided at each end of the visor 1 on the inside of the downwardly turned ends 4, which angle members are disposed with their vertical legs adjacent and spaced inwardly a short distance from the said turned ends 4 and are secured to the inner top surface of the visor by any suitable means, such as spot welding when the visor is made of metal.

As shown in Figs. 2 and 4, the downwardly projecting leg of the angle member 3 provides an end-flange 3.1 for the visor by means of which the visor is mounted on the supporting member or bracket 2. As shown in Fig. 3 the end-flange 3.1 is provided with a pair of longitudinal slots 5 and 6 which are aligned with each other and are horizontally directed; and the flange 3.1 is mounted on or attached to the supporting bracket 2 by means of bolts 7 and 7.1 which pass through the slots 5 and 6 and suitable apertures in the bracket 2.

Preferably the bolts 7 and 7.1 are provided with square shanks adjacent the head portion so that they will not turn in the slots 5 and 6, and are positioned in the slots 5 and 6 prior to the fastening of the angle members 3 onto the awning or visor, the heads of the bolts 7 and 7.1 occupying the space between the flange 3.1 and the downwardly turned end 4 of the visor. The bolts 7 and 7.1 serve as pintles or gudgeons on which the visor end-flange 3.1 is slidable and the rearward bolt 7 serves as a pivot about which the end flange 3.1 can turn or swing as will be hereafter described. Suitable securing means, such as wing nuts 8, may be provided on the bolts 7 and 7.1 for the purpose of clamping or securing the visor to the bracket 2 when the visor is set in the desired position.

It will be understood that two of the supporting members or brackets 2 are required, one right hand and one left hand, to fit the respective sides of the automobile to which they are to be attached. Since these brackets are identical in construction, except for the hand, only one of the brackets will be described in detail.

As before mentioned, the bolts 7 and 7.1 which secure the visor mounting or end-flange 3.1 to the bracket 2, pass through suitable apertures located adjacent one side edge of the bracket. As shown in Fig. 5, the rearward bolt 7 passes through an annular hole in the side of the bracket 2 so as to be held in a fixed position thereon. The aperture for the forward bolt 7.1, nearest the overhanging part of the visor, is in the form of a slot 9 disposed at substantially right angles to the side of the bracket 2, or transversely of the slot 5, so that a tilting movement of the visor may be had, the end flange or mounting flange 3.1 pivoting about the rearward bolt 7 and the forward bolt 7.1 sliding vertically in the slot 9.

As shown in Fig. 3 and as before mentioned horizontal shifting of the visor is obtained by means of the slots 5 and 6 in the visor end flange 3.1. Thus the visor 1 may be shifted horizontally to vary the extent of overhang over the windshield of the automobile, and the forward edge of the visor may be also tilted vertically so as to vary the angular relationship of the visor with respect to the windshield to which it is applied.

On automobiles constructed with the present day sloping windshield and streamlined body contour, the visor, in its horizontal shifting, may be moved rearwardly, or retracted, over the top of the automobile without obstruction, and the extent of overhang may be readily adjusted to suit the driver and particular driving conditions.

As shown in Figs. 3 and 4, the supporting member or bracket 2 is a somewhat triangularly shaped frame, one side of which is arranged to fit within and along the legs of the angle member 3 and the opposite side of which is provided with a pair of inwardly turned lugs or tab-like ears 10 and 11 by means of which the bracket 2 is secured to the automobile door frame.

Preferably the lugs or ears 10 and 11 are bent from the body of the bracket 2 on a radius such that the lugs will follow the curvature of the gutter 12, which is usually provided on the outside of the car body along the upper and forward margin of the car door opening. The lugs 10 and 11 thus are shaped to fit the gutter snugly and their ends are turned outwardly so that they will lie flatly against the inside surface of the door frame of the car body, within the margin of the overlapping flange 13 on the car door.

The lugs or ears 10 and 11 of the bracket 2 are secured to the car body by means of suitable screws or bolts 14, which are screwed into suitably tapped holes in the body door-frame. Thus the bracket 2 is securely mounted on the automobile body in such a way that no visible holes or marring of the exterior body finish will occur, the bracket 2 projecting vertically upward from the car body adjacent the upper portion of the windshield and the securing means being hidden by the flange 13 of the car door.

Usually the supporting member or bracket 2 will be mounted on the car body in a portion of the door frame where the curvature of the door line begins. Hence, it will be understood that the inwardly turned lugs or ears 10 and 11 of the bracket 2 will be formed so as to accommodate the curvature of the door frame at the preferable point of mounting.

As shown in Fig. 1, the improved visor is preferably supported at its center by means of an adjustable supporting member which has one end suitably secured to the center part of the visor and the other end clamped to the vertical dividing bar at the center of the windshield. Such a supporting member is shown in detail in Fig. 7 and comprises a clamp 15 adapted to fit around and be clamped to the center dividing bar of the windshield, which clamp is also pivotally connected to a threaded rod 16 having threaded connection with an elongated nut 17. A second threaded rod 18, having a thread of the opposite hand of the rod 16, is screwed into the opposite end of the nut 17, which is threaded accordingly, and is pivoted at its end to a suitable bracket, not shown, mounted on the underside of the visor at its center portion. Thus the center support for the visor is adjustable by merely turning the elongated nut 17, the nut together with the threaded rods 16 and 18 being in the nature of a turnbuckle.

A modified form of the mounting bracket and the visor supporting means is shown in Figs. 9 and 10, wherein the end-flange 19 of the visor is provided with a single horizontal slot 20 in which a pivot-pin or pintle 21, carried by the side supporting member 22, is engaged. The flange 19 is provided with serrations, or a series of notches 23, along the upper edge of the slot 20 in which the pivot pin or pintle 21 may be engaged, and a tension spring 24 secured between the visor end-flange 19 and the bracket 22, is provided to normally urge the end-flange downwardly so that the pivot or pintle 21 will be held in engagement with one of the serrations or notches 23.

The forward end of the visor is supported by means of a turnbuckle-type member 25 like that shown in Fig. 7 which member is pivotally connected at its ends to the end-flange 19 of the visor and the forward part of the bracket or supporting member 22. The center portion of the visor may also be supported as shown in Fig. 1 if such is desired.

Thus the visor is horizontally adjustable on the pivot or pintle 21 by merely lifting the rear end of the visor, to disengage the pivot 21 from the notches 23 in the visor end-flange, and then sliding or shifting the visor to the desired position where, upon release, the pivot 21 will again engage in the notches and be held under the tension of the spring 24. Pivotal adjustment of the visor is obtained through the turnbuckle 25, which may be extended or retracted by simply turning the elongated nut, and substantially any elevation of the forward end of the visor may be had within the limits of the turnbuckle.

It will be observed that when the visor of Figs. 9 and 10 is adjusted horizontally, the turnbuckle support 25 will pivot or swing about its connections so that, in most cases, only the single horizontal adjustment is necessary to provide a desirable setting for the visor. Thus rapid and easy adjustment, without the necessity of tools or the loosening and tightening of securing nuts, is obtained. This feature is one of particular advantage.

As shown in Fig. 9, the visor end is turned downwardly, as in the case of the form shown in Figs. 1 to 6, inclusive, and the end-flange 19 is spaced somewhat inside of the turned visor end. The upper end of the supporting bracket 22 is housed within this space between the end-flange and the visor end. Also the pivot or pintle 21, the horizontal slot 20 and the connections between the end-flange and the spring 24 and support 25 are located behind the turned end of the visor. In this way substantially all of the operating parts of the visor are housed and hidden from view.

The bracket 22 is preferably mounted on the automobile body in the same manner as the bracket 2 shown in Figs. 1 to 5, inclusive, the inwardly turned lugs or ears 26 and 27 being provided for this purpose, although it will be understood that any other suitable mounting means may be provided.

It will also be understood that the arrangement shown in Figs. 8 and 9 will be provided at each end or side of the visor, any difference being only in that one side is right hand and the other side left hand, the left hand side being shown in the drawings.

The improved visor construction, and the particularly modified form shown in Figs. 9 and 10, is readily adaptable for operation from the interior of the automobile by any suitable means arranged to have a driving connection with the visor for causing horizontal sliding movement of the same relative to its supporting brackets. A means for accomplishing such operation is illustrated in Figs. 9 and 11.

In the form shown in Fig. 9, the interior visor operating means comprises an operating shaft 28 which extends through, and is journaled in, a suitable opening in the roof of the automobile just above the vertical center line of the windshield. The shaft 28 carries at its outer end a pinion 29, which meshes with a rack 30 mounted on one side of a channel 31 extending transversely on the visor at its center and in a fore and aft direction. The channel 31 is provided with a longitudinal slot 32 through which the shaft 28 passes and along which the shaft 28 rides as the visor is shifted through coaction of the pinion 29 and the rack 30.

As shown, a bearing plate 33 is disposed between the pinion 29 and the inner surface of the visor, and the upper end of the shaft 29 is spherically shaped in order to provide a bearing 34 to engage the bearing plate 33. Also a bearing washer 35 is provided on the underside of the pinion 29 for engagement with the inwardly extending lower side portions of the channel 31.

The purpose of this arrangement is so that the shaft 28 may be utilized to lift the rearward portion of the visor and disengage end-flanges from the pivots 21 on the side-supporting brackets, the shaft 28 being axially slidable in its journal in the roof of the automobile, and having a hand wheel or control nob 36 on its inward end.

Thus to manipulate the improved visor from the side of the automobile, it is only necessary to push upwardly on the hand wheel 36 so that the shaft 28 will lift the rearward end of the visor and then to turn the hand wheel in the desired direction according to whether the visor is to be extended or retracted, shifting of the visor being had through the coaction of the pinion 29 and the rack 30. When the visor is adjusted to the desired position, the hand wheel 36 is released and the visor end-flanges will then become engaged with the respective pivots under the action of the respective tension springs connected between the mounting brackets and the visor end-flanges.

The improved visor and mounting brackets may be painted or finished to match the finish of the automobile on which it is to be used and the smooth unbroken one piece contour of the visor, which hides the visor end flanges and adjustment parts, lends itself readily to a finished and "built-in" appearance. Preferably the bottom or underneath side of the visor is finished in a color, such as a soft green, which serves to cut down glare and save eye strain particularly in open country and bright sunlight.

The main advantages of my improved auto visor or windshield awning reside in the simple mounting means and in the arrangement whereby the visor is readily adjustable for both extent of overhang and angularity with respect to the windshield. Other advantages lie in the horizontal adjustment arrangement whereby the visor may be shifted rearwardly over the curving top of the automobile, without obstruction, and thereby almost completely retracted when such is desired. Further advantages are to be found in the simple construction of the visor and its mounting means; its adaptability to operation from within the automobile; its overall finished appearance and its ready adaptability to, and conformance with, the streamlined design of present day motor vehicles; and the fact there is no visible marring of the body finish when the visor is applied or removed.

Although two specific embodiments of this invention are herein shown and described, it will be understood that numerous details of the constructions shown may be altered or omitted without departing from the spirit of this invention as defined by the following claims.

I claim:

1. A device of the class described comprising a visor extending across the outer side of the windshield of an automobile and having a mounting flange adjacent each end, each of said flanges having a pair of aligned slots therein extending in the longitudinal direction of said automobile, a mounting bracket at each end of said visor secured to the automobile body, each of said brackets having a pair of spaced apertures registering with the slots of the respective mounting flange and one of said apertures being a slot extending transversely relative to the mounting flange slots, and securing means extending through the slots of each end flange and the apertures of the respective bracket.

2. A device of the class described comprising a visor extending across the outer side of the windshield of an automobile and having a mounting flange fixed adjacent each end, each of said flanges having a pair of aligned slots therein extending in the longitudinal direction of said automobile, a mounting bracket at each end of said visor secured to the automobile body, each of said brackets having a pair of spaced apertures registering with the slots of the respective mounting flange and the forward one of said apertures being a slot extending transversely relative to the mounting flange slots, and securing means extending through the slots of each end flange and the apertures of the respective bracket, said securing means being slidable in said slots.

3. A device of the class described comprising a visor extending across the outer side of the windshield of an automobile and having downwardly turned ends, a mounting flange secured adjacent and extending across each end of said visor, each mounting flange being spaced inwardly from and parallel with the respective turned visor-end and having a pair of aligned longitudinal slots therein, a supporting member at each end of said visor secured to the automobile body, each supporting member having a pair of spaced apertures registering with the slots of the respective mounting flange, the forward one of said apertures being a slot extending transversely of the mounting flange slots, and headed securing means extending through the slots of each mounting flange and the apertures of the respective supporting member, said securing means having their heads disposed in the space between the respective mounting flange and the turned end of said visor.

4. In a device of the class described comprising a visor extending across the windshield of an automobile and supporting means at each end of said visor, each of said supporting means comprising a bracket member secured to the automobile body, a flange member secured adjacent the end of said visor, one of said members having a horizontally directed slot extending in the longitudinal direction of said automobile and the other of said members having a laterally projecting means engaged in said slot, the slotted member having a series of spaced notches along one margin of the slot, means normally urging the said notched margin and said pivot means into engagement with each other, and means having pivoted connection with said flange member and said bracket member arranged to support the forward portion of said visor.

5. In a device of the class described comprising a visor extending across the outer side of the windshield of an automobile, a supporting member at each end of said visor secured to the automobile body and having an inwardly extending pintle means, a flange at each end of said visor extending parallel with the respective end and having a longitudinal slot therein to receive the respective pintle means, the upper margin of each slot having spaced notches to engage the respective pintle means, means normally urging said notched margin of each slot into engagement with the respective pintle means, and pivotally connected means to support the forward portion of each flange from the respective supporting member.

6. In a device of the class described comprising a visor extending across the windshield of an automobile on the outer side thereof and supporting means at each end of said visor, each of said supporting means comprising a flange member secured adjacent the end of said visor and extending therealong, said flange member having a pair of aligned slots therein, a bracket member secured to the automobile body and projecting upwardly therefrom with an upper edge lying along said flange member, a pivot projecting laterally from the rearward part of said bracket member and extending through the rearward slot of said flange member, said bracket member having a slot adjacent its forward end disposed transversely of the forward slot of said flange member, and a securing means extending through the slot of said bracket member and the forward slot of said flange member, said securing means being slidable in said slots.

7. A device of the class described comprising a visor extending across the windshield of an enclosed automobile and overlapping the top thereof, a supporting member at each end of said visor secured to the automobile body, means connecting each supporting member with the respective end of said visor and arranged for sliding movement of said visor in a substantially horizontal direction longitudinally of said automobile, means arranged to hold said visor in any position to which it may be slidably set, and visor operating means having connection with said visor for imparting horizontal shifting movement thereto, said operating means being adapted to release said holding means during operation of said visor.

8. A device of the class described comprising a visor extending across the windshield of an enclosed automobile on the outside thereof, a supporting member at each end of said visor secured to the automobile body adjacent the respective ends of said windshield, means connecting each supporting member with the respective end of said visor and arranged for sliding movement of said visor in a substantially horizontal direction longitudinally of said automobile, means to hold said visor automatically in any position to which it may be slidably set, a rack on said visor extending in the direction of the sliding movement thereof, and driving means disposed to engage said rack and operable to impart shifting movement to said visor, said driving means being adapted to release said holding means upon operation to slidably shift said visor.

9. A device of the class described comprising a visor extending across the windshield of an enclosed automobile, and disposed above said windshield in partially overlapped relation with and above the top of said automobile, a supporting member at each end of said visor secured to the automobile body, pivot means connecting each supporting member with the respective end of said visor and adapted for sliding movement of said visor in a substantially horizontal direction longitudinally of said automobile, and visor operating means including a drive shaft extending upwardly through and journaled in the automobile body above the center-line of the windshield, a pinion mounted on the outer end of said drive shaft, a rack extending transversely across and secured to the underside of said visor and having driving connection with said pinion, means on said visor adapted to hold said pinion in engagement with said rack at all times, and means to rotate said driving shaft to impart a shifting movement to said visor.

10. In a device of the class described comprising a visor disposed above and extending across the windshield of an enclosed automobile and supporting means at each end of said visor, each of said supporting means comprising a bracket member secured to the automobile body adjacent the respective ends of said windshield, a flange member secured adjacent the end of said visor, one of said members having a horizontally directed slot extending in the longitudinal direction of said automobile and the other of said members having a laterally projecting pivot means engaged in and slidable along said slot, the slotted member having a series of spaced notches along one margin of the slot, and means normally urging the said notched margin and said pivot means into engagement with each other; visor shifting means including a rack on said visor extending in the direction of sliding movement thereof, a pinion mounted to operatively engage said rack and drive the same to shift said visor, and driving means for said pinion, said pinion driving means being adapted for operation to disengage each of said pivot means from the notched margin of its respective slot upon operation to shift said visor.

11. A retractable visor for the sloping windshield of an enclosed vehicle comprising a visor assemblage extending from side to side across the vehicle windshield and partially overhanging the vehicle roof, a supporting means at each end of said visor rigidly secured to the vehicle body, and dual connecting means between each end of said visor and the respective supporting means having individual supporting engagement with the visor at spaced locations along the end of the visor, said connecting means being adapted for effecting shifting movement of said visor relative to said supporting means in the longitudinal direction of the vehicle and over the forward end of the vehicle roof, and the forward one of said connecting means at each end of the visor being adapted to adjust said visor pivotally in the vertical direction on the axis of the visor connection with the rearward connecting means.

FRANK E. ELLITHORPE.

REFERENCES CITED

The following references are of record in the file of this patent:

UNITED STATES PATENTS

| Number | Name | Date |
|---|---|---|
| 827,483 | Voorhees | July 31, 1906 |
| 1,434,750 | Pratt | Nov. 7, 1922 |
| 1,442,121 | Brinck | Jan. 16, 1923 |
| 1,484,687 | Veeder | Feb. 26, 1924 |
| 1,550,252 | Hein | Aug. 18, 1925 |
| 1,572,038 | Reinheimer | Feb. 9, 1926 |
| 1,746,334 | Bollesen | Feb. 11, 1930 |
| 2,125,232 | Itzigson | July 26, 1938 |
| 2,447,246 | Groboski et al. | Aug. 17, 1948 |

FOREIGN PATENTS

| Number | Country | Date |
|---|---|---|
| 259,925 | Great Britain | Dec. 2, 1926 |
| 298,500 | Great Britain | Oct. 2, 1928 |
| 301,995 | Great Britain | Dec. 13, 1928 |